United States Patent
Li (10) Patent No.: US 11,861,344 B2
(45) Date of Patent: Jan. 2, 2024

(54) MODULE UPGRADE METHOD AND MODULE TO BE UPGRADED IN UNMANNED AERIAL VEHICLE SYSTEM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 430 days.

(21) Appl. No.: 17/142,646

(22) Filed: Jan. 6, 2021

(65) Prior Publication Data

US 2021/0149661 A1    May 20, 2021

Related U.S. Application Data

(63) Continuation of application No. PCT/CN2018/106558, filed on Sep. 19, 2018.

(30) Foreign Application Priority Data

Jul. 13, 2018  (CN) .......................... 201810771968.2

(51) Int. Cl.
  *G06F 8/65*   (2018.01)
  *B64C 39/02*  (2023.01)
  *B64U 10/00*  (2023.01)

(52) U.S. Cl.
  CPC .............. *G06F 8/65* (2013.01); *B64C 39/024* (2013.01); *B64U 10/00* (2023.01)

(58) Field of Classification Search
  USPC ........................................................ 717/169
  See application file for complete search history.

(56) References Cited

U.S. PATENT DOCUMENTS 10,315,528 B1 *  6/2019  Crawford, Jr. .......... B60L 53/80
10,399,706 B1 *  9/2019  Hanlon ..................... G06N 5/02
(Continued)

FOREIGN PATENT DOCUMENTS

CN      105224355 A      1/2016
CN      106055373 A     10/2016
(Continued)

OTHER PUBLICATIONS

Sünter et al.; "Firmware Updating Systems for Nanosatellites"; in IEEE Aerospace and Electronic Systems Magazine (vol. 31, No. 5, pp. 36-44); May 2016 (Year: 2016).*

(Continued)

*Primary Examiner* — Qing Chen
*Assistant Examiner* — Clint Thatcher (57) ABSTRACT

A module upgrade method and a module to be upgraded in an unmanned aerial vehicle (UAV) system are disclosed in embodiments of the present invention. The method includes: acquiring an upgrade file of the module to be upgraded; upgrading the module to be upgraded according to the upgrade file; judging whether the module to be upgraded is successfully upgraded; and if no, reacquiring an upgrade file of the module to be upgraded, and upgrading the module to be upgraded according to the re-acquired upgrade file until finishing upgrading the module to be upgraded. In this way, the upgrade success rate of the module to be upgraded can be improved by multiple upgrades, and the upgrade method is simple, convenient, easy to implement and high in reliability.

11 Claims, 7 Drawing Sheets

(56) References Cited

U.S. PATENT DOCUMENTS

| | | | | |
|---|---|---|---|---|
| 2016/0217694 A1* | 7/2016 | Batla | ........................ | H04L 67/34 |
| 2018/0068494 A1* | 3/2018 | Hamilton | ................... | H02J 7/35 |
| 2018/0189049 A1* | 7/2018 | Madrid | ................. | G06F 21/575 |
| 2019/0042227 A1* | 2/2019 | Sharma | ..................... | G06F 8/65 |

FOREIGN PATENT DOCUMENTS

| | | |
|---|---|---|
| CN | 106598636 A | 4/2017 |
| CN | 107357601 A | 11/2017 |
| CN | 107608701 A | 1/2018 |
| WO | 2017/067448 A1 | 4/2017 |

OTHER PUBLICATIONS

International Search Report dated Feb. 27, 2019; PCT/CN2018/106558.
The first chinese office action dated Apr. 1, 2020; Appln. No. 201810771968.2.

\* cited by examiner

MODULE UPGRADE METHOD AND MODULE TO BE UPGRADED IN UNMANNED AERIAL VEHICLE SYSTEM

This application is a continuation application of International Application No. PCT/CN2018/106558, filed on Sep. 19, 2018, which claims priority of Chinese Patent Application No. 201810771968.2, filed on Jul. 13, 2018, which is incorporated herein by reference in its entirely.

BACKGROUND

Technical Field

Embodiments of the present invention relate to the technical field of software upgrade, and more particularly, to a module upgrade method and a module to be upgraded in an unmanned aerial vehicle (UAV) system.

Related Art

With the development of a flight technology, an unmanned aircraft or a UAV has been widely applied. The UAV includes a plurality of modules, such as a camera, a holder module, a vision module, four electric tuner modules, an intelligent battery module, an ultrasonic module, a flight control module and an airplane end image transmission module on an airplane side, and a remote control single-chip microcomputer, a ground image transmission module and a remote control panel on a ground side. Each module is an independent hardware and software system, and the modules are connected through a serial port or a network.

It can be seen therefrom that upgrading so many modules and how to ensure a high success rate of upgrading are technical problems to be solved urgently by those skilled in the art.

SUMMARY

The embodiments of the present invention provide a module upgrade method and a module to be upgraded in a UAV system.

In a first aspect, the embodiments of the present invention provide a module upgrade method in a UAV system, which is applied to a module to be upgraded in the UAV system. The method includes:
acquiring an upgrade file of the module to be upgraded;
upgrading the module to be upgraded according to the upgrade file;
judging whether the module to be upgraded is successfully upgraded; and
if no, reacquiring an upgrade file of the module to be upgraded, and upgrading the module to be upgraded according to the re-acquired upgrade file until finishing upgrading the module to be upgraded.

In a possible implementation of the first aspect, judging whether the module to be upgraded is successfully upgraded includes:
judging whether upgrade data in the module to be upgraded is successfully checked;
if yes, judging whether the module to be upgraded is successfully re-booted; and
if yes, determining that the module to be upgraded is successfully upgraded.

In a possible implementation of the first aspect, judging whether the module to be upgraded is successfully upgraded includes:
judging whether the upgraded module to be upgraded is successfully re-booted; and
if yes, determining that the module to be upgraded is successfully upgraded.

In another possible implementation of the first aspect, finishing upgrading the module to be upgraded includes:
when an upgrade count of the module to be upgraded is smaller than a first preset threshold, successfully upgrading the module to be upgraded, and finishing upgrading; or,
when the upgrade count of the module to be upgraded is greater than or equal to the first preset threshold, finishing upgrading the module to be upgraded.

In another possible implementation of the first aspect, the module to be upgraded is communicatively connected to a previous module through a serial interface, and acquiring an upgrade file of the module to be upgraded includes:
acquiring an upgrade file of the module to be upgraded, which is sent by the previous module through the serial interface,
wherein the module to be upgraded does not include a storage unit, and the previous module includes a storage unit and is directly connected to the module to be upgraded through the serial interface.

In another possible implementation of the first aspect, the upgrade file of the module to be upgraded is sent after the previous module closes a serial communication link with other modules except the module to be upgraded.

In another possible implementation of the first aspect, reacquiring an upgrade file of the module to be upgraded includes:
when an upgrade count of the module to be upgraded is greater than or equal to a second preset threshold, reacquiring an upgrade file of the module to be upgraded, which is sent after the previous module closes the serial communication link with the other modules, the second preset threshold being smaller than the first preset threshold.

In another possible implementation of the first aspect, the module to be upgraded includes a storage unit, and acquiring an upgrade file of the module to be upgraded includes:
acquiring an upgrade file of the module to be upgraded, and storing the upgrade file into the storage unit of the module to be upgraded.

In another possible implementation of the first aspect, reacquiring an upgrade file of the module to be upgraded includes:
reacquiring an upgrade file of the module to be upgraded from the storage unit.

In another possible implementation of the first aspect, the method further includes:
storing upgrade information in an upgrade file of the module to be upgraded, the upgrade information including upgrade version information of the module to be upgraded;
acquiring version information of the module to be upgraded after finishing upgrading the module to be upgraded; and
determining an upgrade state of the module to be upgraded according to the version information and/or the upgrade version information.

In another possible implementation of the first aspect, determining an upgrade state of the module to be upgraded according to the version information and/or the upgrade version information includes:

when the version information is not acquired, determining that the module to be upgraded is in a non-upgraded state;

when the version information is acquired and the version information is the same as the upgrade version information, determining that the module to be upgraded is in a successfully upgraded state; and when the version information is acquired and the version information is different from the upgrade version information, determining that the module to be upgraded is in an unsuccessfully upgraded state.

In a second aspect, the embodiments of the present invention provide a module to be upgraded in a UAV system. The module to be upgraded includes:

an acquisition unit, configured to acquire an upgrade file of the module to be upgraded;

an upgrade unit, configured to upgrade the module to be upgraded according to the upgrade file; and a judgment unit, configured to judge whether the module to be upgraded is successfully upgraded, wherein the acquisition unit is further configured to re-acquire an upgrade file of the module to be upgraded when the judgment unit judges that the module to be upgraded is unsuccessfully upgraded, and the upgrade unit is further configured to upgrade the module to be upgraded according to the re-acquired upgrade file until finishing upgrading the module to be upgraded.

In a possible implementation of the second aspect, the judgment unit is specifically configured to judge whether upgrade data in the module to be upgraded is successfully checked, judge whether the module to be upgraded is successfully re-booted if the upgrade data in the module to be upgraded is successfully checked, and determine that the module to be upgraded is successfully upgraded if the module to be upgraded is successfully re-booted.

In another possible implementation of the second aspect, finishing upgrading the module to be upgraded includes:

when an upgrade count of the module to be upgraded is smaller than a first preset threshold, successfully upgrading the module to be upgraded, and finishing upgrading; or, when the upgrade count of the module to be upgraded is greater than or equal to the first preset threshold, finishing upgrading the module to be upgraded.

In another possible implementation of the second aspect, the module to be upgraded is communicatively connected to a previous module through a serial interface. The acquisition unit is specifically configured to acquire an upgrade file of the module to be upgraded, which is sent by the previous module through the serial interface.

In another possible implementation of the second aspect, the upgrade file of the module to be upgraded is sent after the previous module closes a serial communication link with other modules except the module to be upgraded.

In another possible implementation of the second aspect, the acquisition unit is further specifically configured to re-acquire, when an upgrade count of the module to be upgraded is greater than or equal to a second preset threshold, an upgrade file of the module to be upgraded, which is sent after the previous module closes the serial communication link with the other modules, the second preset threshold being smaller than the first preset threshold.

In another possible implementation of the second aspect, the module to be upgraded includes a storage unit. The acquisition unit is specifically configured to acquire an upgrade file of the module to be upgraded, and store the upgrade file into the storage unit of the module to be upgraded.

In another possible implementation of the second aspect, the acquisition unit is further specifically configured to re-acquire an upgrade file of the module to be upgraded from the storage unit.

In another possible implementation of the second aspect, the apparatus further includes:

a storage unit, configured to store upgrade information in an upgrade file of the module to be upgraded, the upgrade information including upgrade version information of the module to be upgraded, the acquisition unit being further configured to acquire version information of the module to be upgraded after finishing upgrading the module to be upgraded; and a determination unit, configured to determine an upgrade state of the module to be upgraded according to the version information and/or the upgrade version information.

In another possible implementation of the second aspect, the determination unit is specifically configured to: determine, when the version information is not acquired, that the module to be upgraded is in a non-upgraded state; determine, when the version information is acquired and the version information is the same as the upgrade version information, that the module to be upgraded is in a successfully upgraded state; and determine, when the version information is acquired and the version information is different from the upgrade version information, that the module to be upgraded is in an unsuccessfully upgraded state.

In a third aspect, the embodiments of the present invention provide a module to be upgraded. The module to be upgraded includes:

a memory, configured to store a computer program; and a processor, configured to execute the computer program to implement the module upgrade method in a UAV system described in the first aspect.

In a fourth aspect, the embodiments of the present invention provide a computer storage medium having a computer program stored therein which, when executed, implements the module upgrade method in a UAV system described in the first aspect.

According to the module upgrade method and the module to be upgraded in a UAV system provided by the embodiments of the present invention, an upgrade file of the module to be upgraded is acquired; the module to be upgraded is upgraded according to the upgrade file; it is judged whether the module to be upgraded is successfully upgraded; and if no, an upgrade file of the module to be upgraded is re-acquired, and the module to be upgraded is upgraded according to the re-acquired upgrade file until finishing upgrading the module to be upgraded. That is, in this embodiment, the upgrade success rate of the module to be upgraded can be improved by multiple upgrades, and the upgrade method is simple, convenient, easy to implement and high in reliability.

BRIEF DESCRIPTION OF THE DRAWINGS

To describe the technical solutions in the embodiments of the present invention or in the prior art clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and thoroughly describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative effects shall fall within the protection scope of the present invention.

Figure 1:
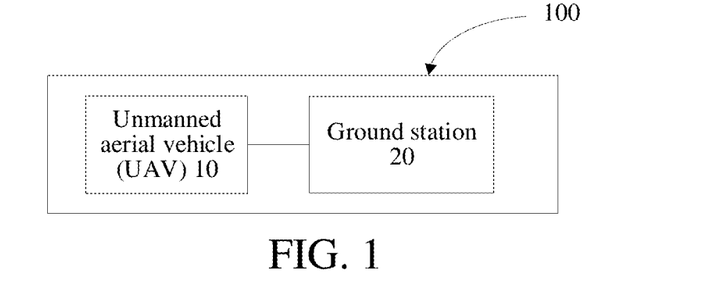
FIG. 1 is a schematic diagram of an application environment of a UAV system according to an embodiment of the present invention.

FIG. 1 is a schematic diagram of one application environment of a module upgrade method in a UAV system according to an embodiment of the present invention. The application environment includes: a UAV system 100. The UAV system 100 includes a UAV 10 and a ground station 20. When a module in the UAV system 100 is upgraded, the UAV 10 establishes a connection with the ground station 20 to upgrade the module to be upgraded in the UAV system 100.

In one embodiment, for the UAV 10 of the UAV system 100, the UAV 10 includes a camera, a vision module, a holder module, four electric tuner modules, an intelligent battery module, an ultrasonic module, a flight control module, an airplane image transmission module, etc. For the ground station 20 of the UAV system 100, the ground station 20 includes a remote control single-chip microcomputer, a ground image transmission module, a remote control panel, etc., which may be modules to be upgraded.

In one embodiment, the camera module, the airplane image transmission module, the ground image transmission module and the remote control panel are all provided with own storage units, which are used to store upgrade files for upgrading the module to be upgraded in the UAV system 100.

In the embodiments of the present application, the UAV 10 may be a fixed-wing UAV, a multi-rotor UAV, etc. Here, the UAV may be referred to as an unmanned aerial vehicle. In some other embodiments, it may also be other aerial vehicles, such as an unmanned spacecraft.

The ground station 20 may be any suitable device having a remote control function, such as a remote control.

In order to cause the UAV system 100 to better meet the requirements of users or improve the stability of the UAV system 100, the module to be upgraded in the UAV system 100 generally needs to be upgraded so as to optimize the functions of the UAV system 100 and enable users to have better experience. Because the modules in the UAV system are numerous, the current upgrade mode cannot guarantee the success rate of the module to be upgraded.

In combination with the application scenario, the embodiments of the present invention mainly aim to provide a module upgrade method in a UAV system, which can improve the success rate of the module to be upgraded in the UAV system 100.

The embodiments of the present invention are further described below with reference to the accompanying drawings.

Figure 3:
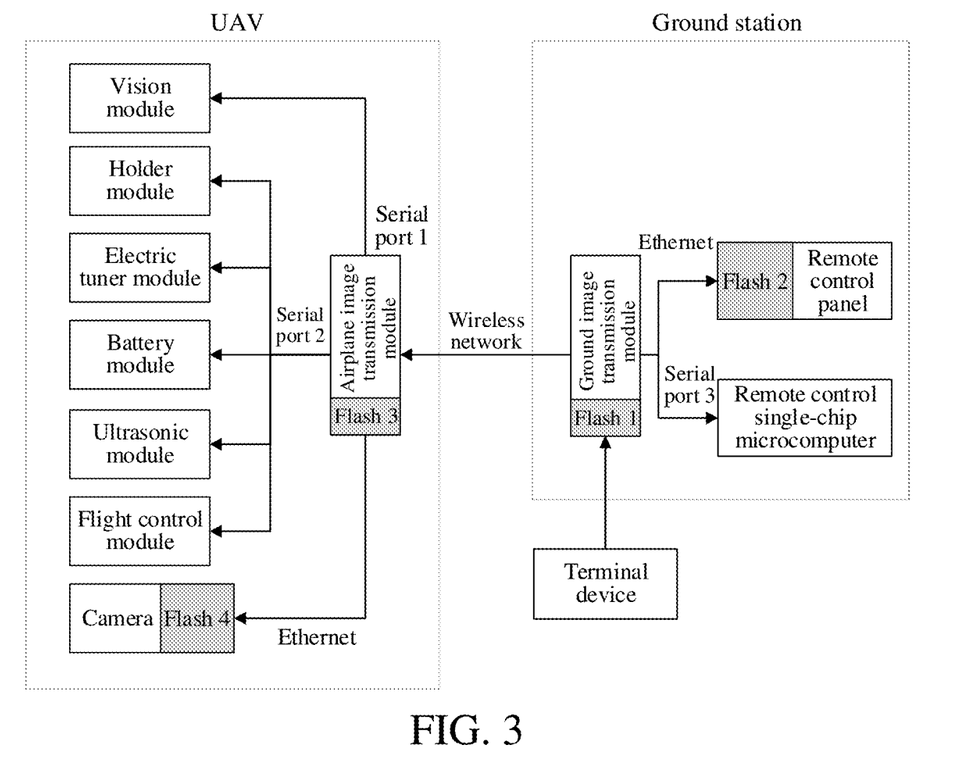
FIG. 3 is an application scenario diagram of a module upgrade method in a UAV system according to Embodiment 1 of the present invention.

A module upgrade method in a UAV system provided by the embodiments of the present invention is applied to a module to be upgraded in the UAV system, such as a UAV system as shown in FIG. 3. The module to be upgraded in the UAV system may be implemented by combining software with hardware. Here, the module to be upgraded may also be understood as an independent functional system. The UAV system includes a UAV and a ground station, and the module to be upgraded may be a module in the UAV or a module in the ground station.

According to the technical solution of this embodiment, firstly, an upgrade file of a module to be upgraded is acquired; then, the module to be upgraded is upgraded according to the upgrade file; then, it is judged whether the module to be upgraded is successfully upgraded; and if no, an upgrade file of the module to be upgraded is re-acquired, and the module to be upgraded is upgraded according to the re-acquired upgrade file until finishing upgrading the module to be upgraded. In this way, the upgrade success rate of the module to be upgraded can be improved by multiple upgrades.

Meanwhile, in this embodiment, by recording an upgrade result of the module to be upgraded, the upgrade result of the module to be upgraded can be accurately checked.

The following describes technical solutions of the present invention in detail with reference to specific embodiments. The following specific embodiments may be combined with each other, and the same or similar concepts or processes may not be repeated in some embodiments.

Figure 2:
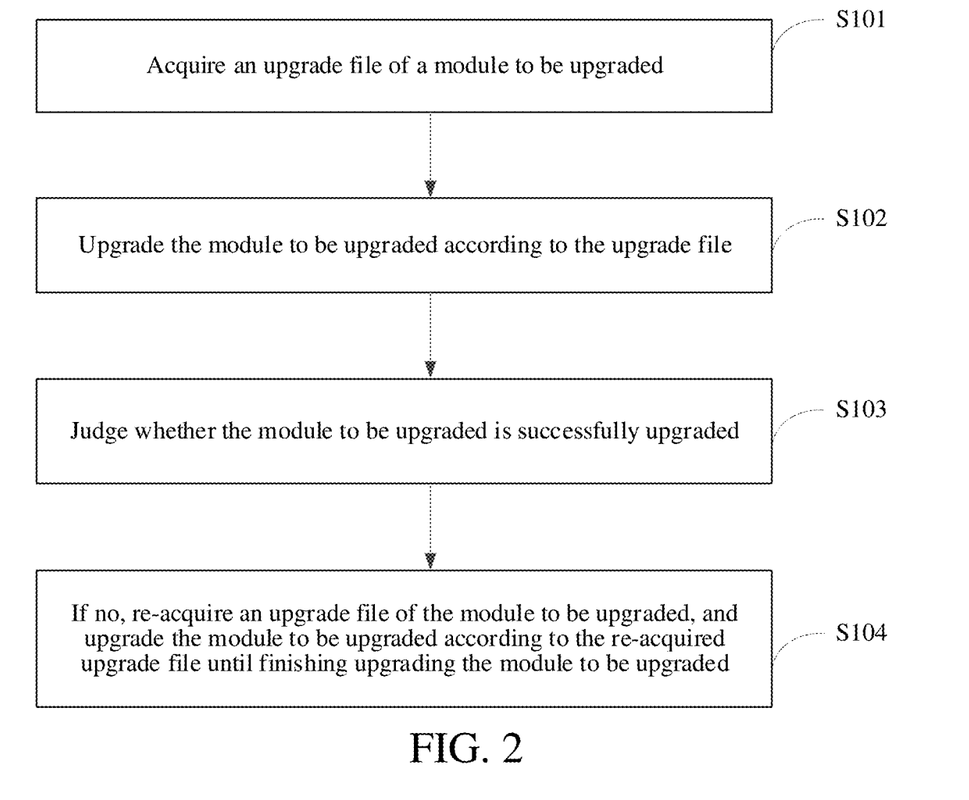
FIG. 2 is a flowchart of a module upgrade method in a UAV system according to Embodiment 1 of the present invention.

FIG. 2 is a flowchart of a module upgrade method in a UAV system according to Embodiment 1 of the present invention. As shown in FIG. 2, the method in this embodiment may include the following steps.

In S101, an upgrade file of a module to be upgraded is acquired.

The upgrade file is typically stored in a part of a storage unit of the module to be upgraded.

In S102, the module to be upgraded is upgraded according to the upgrade file.

The executive body of this embodiment is a software upgrade apparatus with a software upgrade function. The software upgrade apparatus may be a separate device. At this moment, the software upgrade apparatus is communicatively connected to the module to be upgraded.

Alternatively, the software upgrade apparatus of this embodiment may be a part of the module to be upgraded, such as a central processing unit (CPU) in the module to be upgraded.

FIG. 3 is an application scenario diagram of a module upgrade method in a UAV system according to Embodiment 1 of the present invention. The UAV system as shown in FIG. 3 includes a plurality of modules to be upgraded. For example, an airplane side includes a camera, a holder module, a vision module, four electric tuner modules, an intelligent battery module, an ultrasonic module, a flight control module, an airplane end image transmission module, etc. A ground side includes a remote control single-chip microcomputer, a ground image transmission module, a remote control panel, etc.

In the UAV system as shown in FIG. 3, the modules to be upgraded include two main types: modules to be upgraded with storage units, such as a remote control panel; and modules to be upgraded without storage units, such as a flight control module.

An upgrade file of the module to be upgraded with the storage unit is stored in the storage unit. For example, the upgrade file of the remote control panel is stored in the storage unit of the remote control panel. In this way, the remote control panel may directly read the upgrade file of the remote control panel from the own storage unit.

An upgrade file of the module to be upgraded without the storage unit may be stored in the module to be upgraded with the storage unit, which is in serial connection with the module to be upgraded. For example, as shown in FIG. 3, the flight control module is connected to the airplane image transmission module through a serial port 2, and the upgrade file of the flight control module may be stored in the storage unit of the airplane image transmission module. In this way, the flight control module may read the own upgrade file from the storage unit of the airplane image transmission module through the serial port 2.

Alternatively, the upgrade file of this embodiment may be uploaded by a terminal device. For example, as shown in FIG. 3, the terminal device is connected to a ground image transmission device in the UAV system. A file of each module to be upgraded is sent to each module to be upgraded through the ground image transmission device and a communication link between various devices in the UAV system. Specifically, for the module to be upgraded with the storage unit, the upgrade file may be directly stored in the storage unit of the module to be upgraded, and for the module to be upgraded without the storage unit, the upgrade file may be stored in other modules to be upgraded with the storage units, which are in serial connection with the module to be upgraded.

In this embodiment, the software upgrade processes of modules to be upgraded are consistent, and one module to be upgraded is taken as an example for description in this embodiment, and other modules to be upgraded may be referred to the description.

In this step, an upgrade file of the module to be upgraded is firstly acquired, and the module to be upgraded is then upgraded according to the upgrade file. For example, if the upgrade file is a full upgrade file, a previous upgrade file of the module to be upgraded is completely replaced with the upgrade file. If the upgrade file only includes a patch file, the patch file is added to the module to be upgraded for supplementing the previous upgrade file of the module to be upgraded. The software upgrade of a module to be upgraded according to an upgrade file is a common technical means in the art and will not be repeated here.

In a possible implementation of this embodiment, the module to be upgraded in this embodiment includes an App area, and upgrading the module to be upgraded in this step may specifically include refreshing the upgrade file to the App area of the module to be upgraded to finish upgrading of the module to be upgraded.

In S103, it is judged whether the module to be upgraded is successfully upgraded.

According to the foregoing steps, after the module to be upgraded is upgraded, an upgrade result of the module to be upgraded needs to be judged.

In one example, judging whether the module to be upgraded is successfully upgraded may be: checking upgrade data in the module to be upgraded, if the checking is successful, determining that the module to be upgraded is successfully upgraded, and if the checking is unsuccessful, determining that the module to be upgraded is unsuccessfully upgraded.

In another example, judging whether the module to be upgraded is successfully upgraded may be: re-booting the upgraded module to be upgraded, if the re-boot is successful, determining that the module to be upgraded is successfully upgraded, and if the re-boot is unsuccessful, determining that the module to be upgraded is unsuccessfully upgraded.

In S104, if no, an upgrade file of the module to be upgraded is re-acquired, and the module to be upgraded is upgraded according to the re-acquired upgrade file until finishing upgrading the module to be upgraded.

In this embodiment, according to the foregoing steps, if it is determined that the module to be upgraded is unsuccessfully upgraded, an upgrade file of the module to be upgraded is re-acquired, and the module to be upgraded is upgraded according to the re-acquired upgrade file. Next, S103 is re-executed to judge whether the module to be upgraded is successfully upgraded, if no, an upgrade file is continuously re-acquired, and the module to be upgraded is re-upgraded according to the re-acquired upgrade file until finishing upgrading the module to be upgraded. In this way, the upgrade success rate of the module to be upgraded can be improved by the multiple upgrades.

In a possible implementation of this embodiment, S104 in which upgrading of the module to be upgraded is finished may include the following steps.

When an upgrade count of the module to be upgraded is smaller than a first preset threshold, the module to be upgraded is successfully upgraded, and upgrading is finished. For example, the preset first preset threshold is n, and when the upgrade count of the module to be upgraded is smaller than n and the module to be upgraded is successfully upgraded, upgrading of the module to be upgraded may be finished.

Or, when the upgrade count of the module to be upgraded is greater than or equal to the first preset threshold, upgrading of the module to be upgraded is finished. For example, when the upgrade count of the module to be upgraded is greater than or equal to n, the module to be upgraded may not have been successfully upgraded, but at this moment, in order to prevent the upgrade from circulating indefinitely, upgrading of the module to be upgraded is stopped.

According to the module upgrade method in a UAV system provided by the embodiments of the present invention, an upgrade file of the module to be upgraded is acquired; the module to be upgraded is upgraded according to the upgrade file; it is judged whether the module to be upgraded is successfully upgraded; and if no, an upgrade file of the module to be upgraded is re-acquired, and the module to be upgraded is upgraded according to the re-acquired upgrade file until finishing upgrading the module to be upgraded. That is, in this embodiment, the upgrade success rate of the module to be upgraded can be improved by multiple upgrades, and the upgrade method is simple, convenient, easy to implement and high in reliability.

Figure 4:
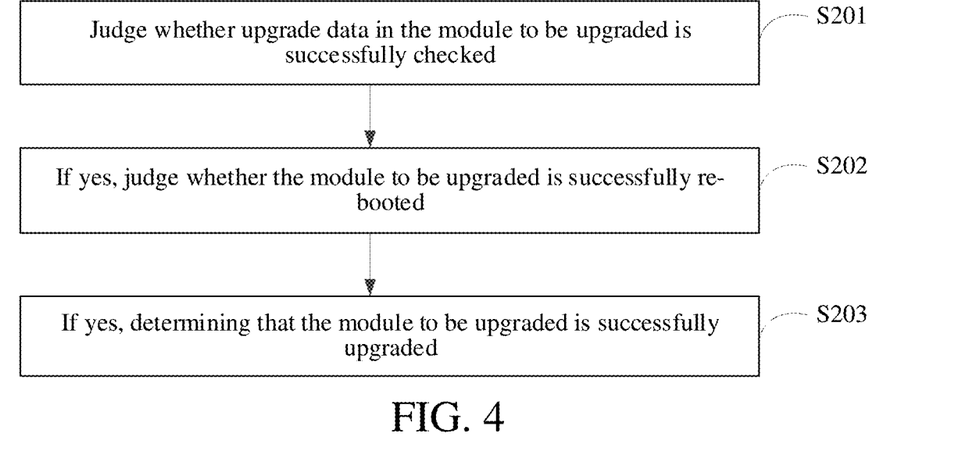
FIG. 4 is a flowchart of a module upgrade method in a UAV system according to Embodiment 2 of the present invention.

FIG. 4 is a flowchart of a module upgrade method in a UAV system according to Embodiment 2 of the present invention. On the basis of the foregoing embodiment, as shown in FIG. 4, S103 of judging whether the module to be upgraded is successfully upgraded may include the following steps.

In S201, it is judged whether upgrade data in the module to be upgraded is successfully checked.

In this embodiment, checking upgrade data in a module to be upgraded may be: judging whether upgrade data in a module to be upgraded is matched with upgrade data in an upgrade file of the module to be upgraded, if yes, determining that the upgrade data in the module to be upgraded is successfully checked, and if no, determining that the upgrade data in the module to be upgraded is successfully checked.

Specifically, upgrade data stored in an upgraded module to be upgraded is firstly acquired, and the upgrade data is recorded as first upgrade data for the convenience of explanation. Meanwhile, upgrade data in an upgrade file of the module to be upgraded is acquired, and the upgrade data is recorded as second upgrade data.

The first upgrade data and the second upgrade data may have the size of corresponding upgrade data or a check code of the upgrade data, etc.

Then, it is judged whether the first upgrade data is matched with the second upgrade data, and if yes, it is determined that the upgrade data in the module to be upgraded is successfully checked. If no, it is determined that the upgrade data in the module to be upgraded is unsuccessfully checked, an upgrade file of the module to be upgraded needs to be re-acquired, and the module to be upgraded is upgraded according to the re-acquired upgrade file.

By way of example, it is assumed that the first upgrade data and the second upgrade data both have the size of upgrade data, the size of the second upgrade data being b. Therefore, after the module to be upgraded is upgraded for the first time according to the upgrade file, the size of the first upgrade data after the module to be upgraded is acquired to be a. It is judged that the size a of the first upgrade data is not matched with the size b of the second upgrade data, that is, a is not equal to b, and it may be determined that the first upgrading of the module to be upgraded is unsuccessful. Then, an upgrade file is re-acquired, the module to be upgraded is re-upgraded according to the re-acquired upgrade file, it is continuously judged whether the size a of the first upgrade data of the module to be upgraded after the second upgrade is equal to the size b of the second upgrade data, if no, the upgrade file is continuously re-acquired, and the module to be upgraded is upgraded again according to the re-acquired upgrade file until the size of data to be upgraded is equal to the size of the second upgrade data.

In S202, if yes, it is judged whether the module to be upgraded is successfully re-booted.

In S203, if yes, it is determined that the upgraded module is successfully upgraded.

In order to accurately judge whether the module to be upgraded is successfully upgraded, if the upgrade data in the module to be upgraded is successfully checked, it is also necessary to judge whether the module to be upgraded may be re-booted.

Specifically, after the module to be upgraded is upgraded, if it is judged that the upgrade data in the module to be upgraded is successfully checked, the module to be upgraded is re-booted. For example, a boot loader of the module to be upgraded is booted, and if the boot loader may be booted, it is determined that the module to be upgraded is successfully upgraded. If the boot loader is not successfully booted, it is determined that the module to be upgraded is unsuccessfully upgraded currently. At this moment, the module to be upgraded needs to be re-upgraded. Specifically, an upgrade file of the module to be upgraded is re-acquired, and the module to be upgraded is upgraded according to the re-acquired upgrade file. The foregoing steps are repeated until the module to be upgraded is successfully re-booted.

According to the module upgrade method in a UAV system provided by the embodiments of the present invention, it is judged whether upgrade data in the module to be upgraded is successfully checked, if yes, it is judged whether the module to be upgraded is successfully re-booted, and if yes, it is determined that the module to be upgraded is successfully upgraded. In this way, through double judgment, the accurate judgment of the upgrade success of the module to be upgraded can be improved, and the upgrade reliability of the module to be upgraded can be further improved.

Figure 5:
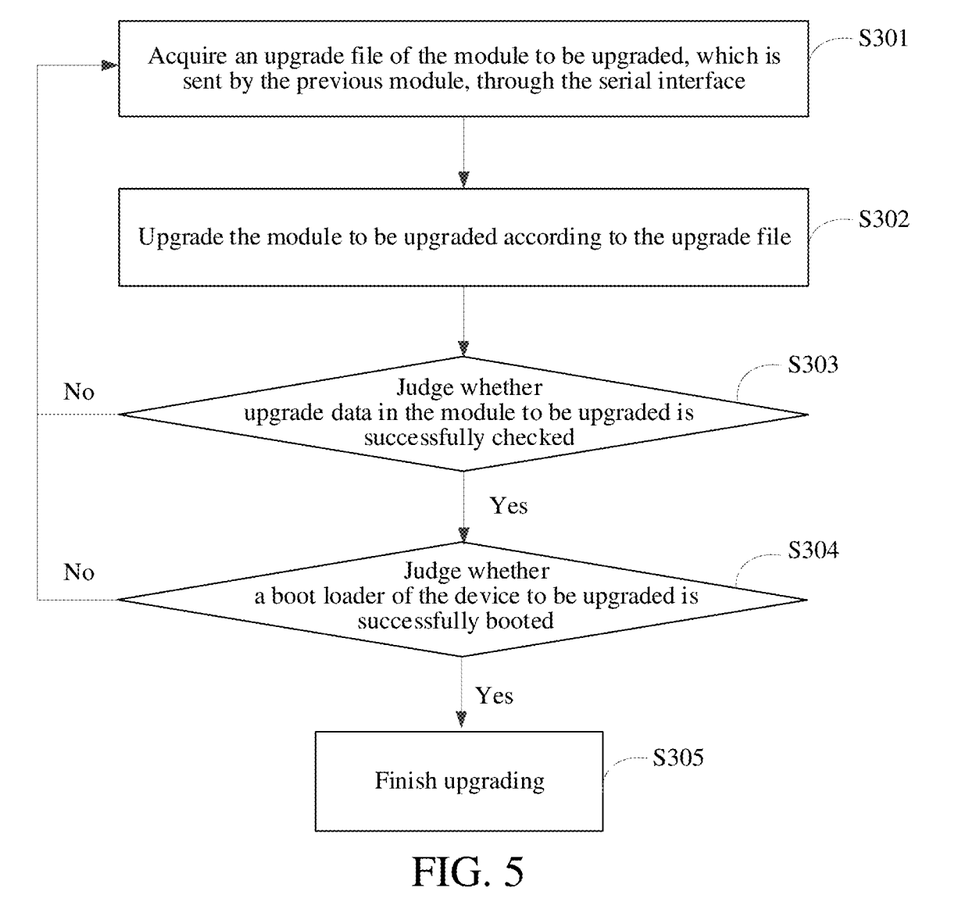
FIG. 5 is a flowchart of a module upgrade method in a UAV system according to Embodiment 3 of the present invention.

FIG. 5 is a flowchart of a module upgrade method in a UAV system according to Embodiment 3 of the present invention. On the basis of the foregoing embodiment, as shown in FIG. 5, if the module to be upgraded does not include a storage unit, the upgrade process of the module to be upgraded in this embodiment may include the following steps.

In S301, an upgrade file of the module to be upgraded, which is sent by the previous module, is acquired through a serial interface.

In this embodiment, the previous module refers to a module that includes a storage unit and is directly connected to the module to be upgraded through the serial interface. The module to be upgraded is communicatively connected to a previous module through a serial interface. The module to be upgraded does not include a storage unit. Therefore, the upgrade file of the module to be upgraded may be stored in the storage unit of the previous module that is in serial connection with the module to be upgraded. For example, as shown in FIG. 3, the upgrade file of the flight control module may be stored in the storage unit of the airplane image transmission module, and the flight control module communicates with the airplane image transmission module through a serial port 2.

In the upgrade process of the flight control module, the upgrade file of the flight control module is read from the storage unit of the airplane image transmission module through the serial port 2.

In S302, the module to be upgraded is upgraded according to the upgrade file.

Specifically, as shown in Table 1, a module to be upgraded without a storage unit includes two areas, namely an area where a boot loader is located and an App area, the area where the boot loader is located being marked as a boot loader area.

TABLE 1

| Boot loader area | App area |
| --- | --- |

With reference to the above example, the upgrade file of the flight control module received from the serial port 2 is refreshed to the App area of the flight control module. The detailed process thereof will be described with reference to the foregoing embodiments, and will not be repeated here.

In S303, it is judged whether upgrade data in the module to be upgraded is successfully checked.

If yes, S304 is executed, and if no, the process returns to S301.

With reference to the above example, the module to be upgraded adopts a flight control module. As shown in FIG. 3, if upgrade data in the flight control module is not matched with the upgrade data in the upgrade file of the flight control module after the module to be upgraded is upgraded, it is determined that the upgrade data in the module to be upgraded is unsuccessfully checked. At this moment, the module to be upgraded continues to re-read the upgrade file of the flight control module again from the airplane image transmission module through the serial port 2, and the App area of the flight control module is re-refreshed by using the re-read upgrade file until the upgrade data in the flight control module is successfully checked.

In S304, it is judged whether the module to be upgraded is successfully re-booted.

If yes, S305 is executed, and if no, S301 is executed.

In practical application, when the upgrade file is in error, the boot loader of the module to be upgraded cannot be booted normally after the upgrade. Therefore, in order to avoid the problem in this embodiment, after the upgrade data in the module to be upgraded is successfully checked, and in order to further improve the accuracy of software upgrade detection, the module to be upgraded is re-booted in this embodiment. Specifically, the boot loader of the module to be upgraded is booted, and if the boot loader may be booted, it is determined that software of the module to be upgraded is successfully upgraded. If the boot loader is not successfully booted, it is determined that the module to be upgraded is unsuccessfully upgraded currently. At this moment, the module to be upgraded needs to be re-upgraded. Specifically, an upgrade file of the module to be upgraded is re-acquired, the re-acquired upgrade file is refreshed to the App area of the module to be upgraded, and then S303 is re-executed until the module to be upgraded is successfully booted.

In S305, upgrading is finished.

According to the module upgrade method in a UAV system provided by the embodiments of the present invention, for a module to be upgraded which does not include a storage unit, an upgrade file of the module to be upgraded, which is sent by a previous module, is acquired through a serial port; it is judged whether the module to be upgraded is successfully upgraded; and if no, an upgrade file of the module to be upgraded is re-acquired, and the module to be upgraded is upgraded according to the re-acquired upgrade file until finishing upgrading the module to be upgraded.

Thus, the detection accuracy of the module to be upgraded which does not include the storage unit is improved, thereby further improving the success rate of software upgrade.

Figure 6:
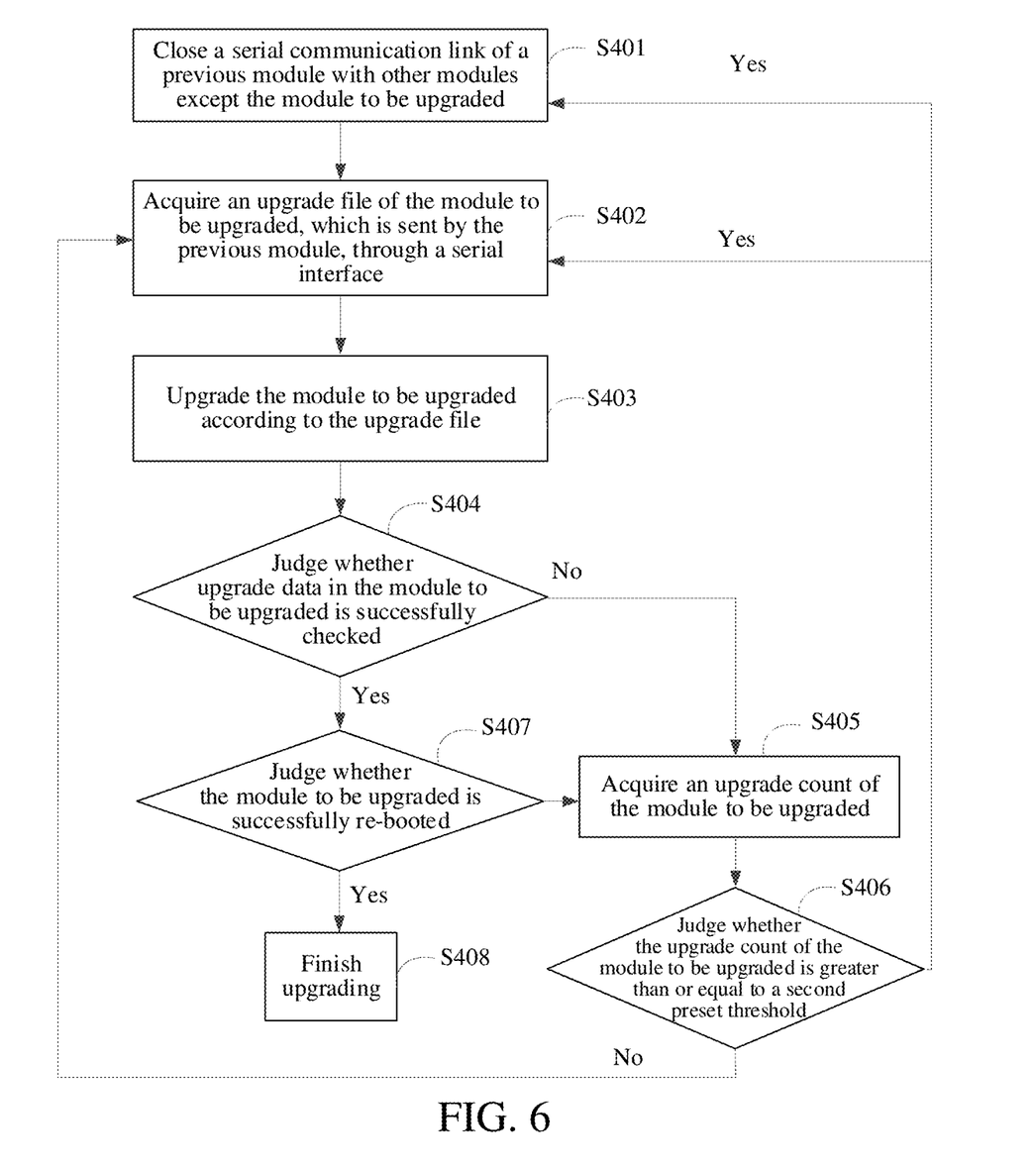
FIG. 6 is a flowchart of a module upgrade method in a UAV system according to Embodiment 4 of the present invention.

FIG. 6 is a flowchart of a module upgrade method in a UAV system according to Embodiment 4 of the present invention. On the basis of the foregoing embodiment, as shown in FIG. 6, an upgrade process for a module to be upgraded which does not include a storage unit may further include the following steps.

In S401, a serial communication link of a previous module with other modules except the module to be upgraded is closed.

In this embodiment, an upgrade file of the module to be upgraded is sent after the previous module closes the serial communication link with other modules except the module to be upgraded.

According to this embodiment, if the module to be upgraded acquires the upgrade file of the module to be upgraded from other modules through the serial port, in order to ensure that the serial port can efficiently and accurately send the upgrade file to the module to be upgraded, other communications except the upgrade file in the serial port are closed, and the upgrade success rate of the module to be upgraded is improved.

For example, as shown in FIG. 3, when the flight control module is upgraded, a serial communication link between the airplane image module and the flight control module is opened through the serial port 2, and a serial communication link between the airplane image module and other modules (for example, the holder module and the vision module) is closed.

Meanwhile, the module to be upgraded in this embodiment may also perform information transmission with other modules in the upgrade process, so that software to be upgraded in the module to be upgraded may be in a running state, and the software in the running state cannot be completely upgraded. At this moment, other communications except a file to be upgraded in the module to be upgraded needs to be closed so as to ensure the normal progress of the upgrade process and improve the success rate of upgrading.

In S402, an upgrade file of the module to be upgraded, which is sent by the previous module, is acquired through a serial interface.

In S403, the module to be upgraded is upgraded according to the upgrade file.

In S404, it is judged whether upgrade data in the module to be upgraded is successfully checked.

If yes, S407 is executed, and if no, S405 is executed.

In S405, an upgrade count of the module to be upgraded is acquired.

In S406, it is judged whether the upgrade count of the module to be upgraded is greater than or equal to a second preset threshold.

If yes, S401 is re-executed, and if no, S402 is executed.

That is, in this embodiment, when the upgrade count of the module to be upgraded is greater than or equal to a second preset threshold, an upgrade file of the module to be upgraded, which is sent after the previous module closes the serial communication link with the other modules, is re-acquired, the second preset threshold being smaller than the first preset threshold.

Specifically, the upgrade count acquired by S405 are compared with a second preset threshold, and if the upgrade count exceeds the second preset threshold, S401 is executed, that is, other communications with modules except the module to be upgraded are closed, and subsequent steps such as S402 are executed. If the upgrade count does not exceed the second preset threshold, S402 is executed, that is, the module to be upgraded is upgraded according to the upgrade file of the module to be upgraded.

The second preset threshold is set according to actual requirements and is smaller than the first preset threshold.

In S407, it is judged whether the module to be upgraded is successfully re-booted.

If yes, S408 is executed, and if no, S405 is executed.

Specifically, if the upgrade data in the module to be upgraded is successfully checked, the boot loader of the module to be upgraded is booted, and if the boot loader is successfully booted, S408 is executed for successful software upgrade. If the boot loader is unsuccessfully booted, S405 is executed to acquire the upgrade count of the module to be upgraded. If the upgrade count exceeds the second preset threshold, S401 is executed. If the upgrade count does not exceed the second preset threshold, S402 is executed, that is, the module to be upgraded is upgraded according to the upgrade file of the module to be upgraded.

In S408, upgrading is finished.

According to the module upgrade method in a UAV system provided by this embodiment, it is determined, according to an upgrade count of a module to be upgraded, whether a serial communication link between a previous module and other modules is re-closed or the module to be upgraded is upgraded according to an upgrade file of the module to be upgraded, thereby further improving the accuracy and success rate of software upgrade of the module to be upgraded.

Figure 7:
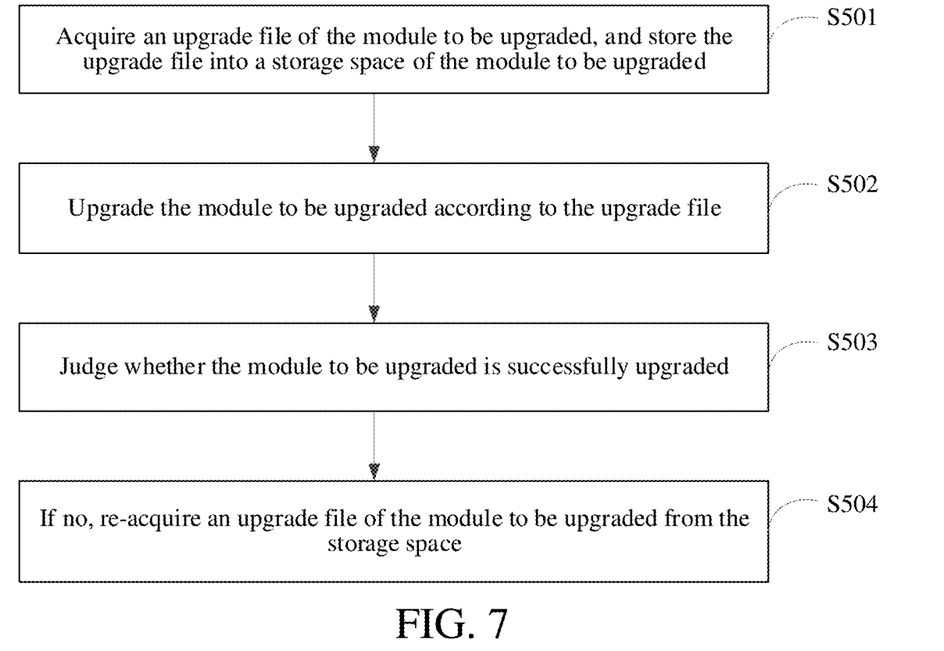
FIG. 7 is a flowchart of a module upgrade method in a UAV system according to Embodiment 5 of the present invention.

FIG. 7 is a flowchart of a module upgrade method in a UAV system according to Embodiment 5 of the present invention. On the basis of the foregoing embodiment, as shown in FIG. 7, if the module to be upgraded includes a storage unit, the upgrade process in this embodiment may include the following steps.

In S501, an upgrade file of the module to be upgraded is acquired, and the upgrade file is stored into the storage unit of the module to be upgraded.

In S502, the module to be upgraded is upgraded according to the upgrade file.

In S503, it is judged whether the module to be upgraded is successfully upgraded.

In S504, if no, an upgrade file of the module to be upgraded is re-acquired from the storage unit.

Specifically, as shown in Table 2, a module to be upgraded with a storage unit includes three areas, namely an area where a boot loader is located, an App area and an area where the storage unit is located, the area where the boot loader is located being denoted as a boot loader area, and the storage unit storing an upgrade file.

TABLE 2

| Boot loader area | App area | Storage unit |

In an actual upgrade process, an upgrade file of the module to be upgraded is acquired, the upgrade file is stored into a storage unit of the module to be upgraded, the upgrade file of the module to be upgraded is read from the storage unit, and the upgrade file is refreshed to the App area of the module to be upgraded.

Then, it is judged whether the module to be upgraded is successfully upgraded. The detailed process thereof will be described with reference to the above description. If it is judged that the module to be upgraded is unsuccessfully upgraded, an upgrade file of the module to be upgraded is re-acquired from the storage unit, and the module to be upgraded is upgraded according to the re-acquired upgrade file. The foregoing steps are repeated until finishing upgrading the module to be upgraded.

In this embodiment, the upgrade file is read from the storage unit of the module to be upgraded for upgrading, the upgrade process is simple, and the upgrade speed is high.

Alternatively, in this embodiment, the boot loader in the module to be upgraded may be controlled to read an upgrade file from the storage device, the boot loader may be controlled to read the upgrade data of the module to be upgraded from the App area, and an upgrade file of the module to be upgraded may be read from the storage unit to judge whether the two upgrade files are matched.

According to the module upgrade method in a UAV system provided by the embodiments of the present invention, for a module to be upgraded which includes a storage unit, an upgrade file in the storage unit is refreshed to an App area of the module to be upgraded, upgrade data of the module to be upgraded is read from the App area, and an upgrade file of the module to be upgraded is read from the storage unit to judge whether the two upgrade files are matched. The entire software upgrade process is simple, the upgrade speed is high, and the module to be upgraded can be quickly upgraded.

Figure 8:
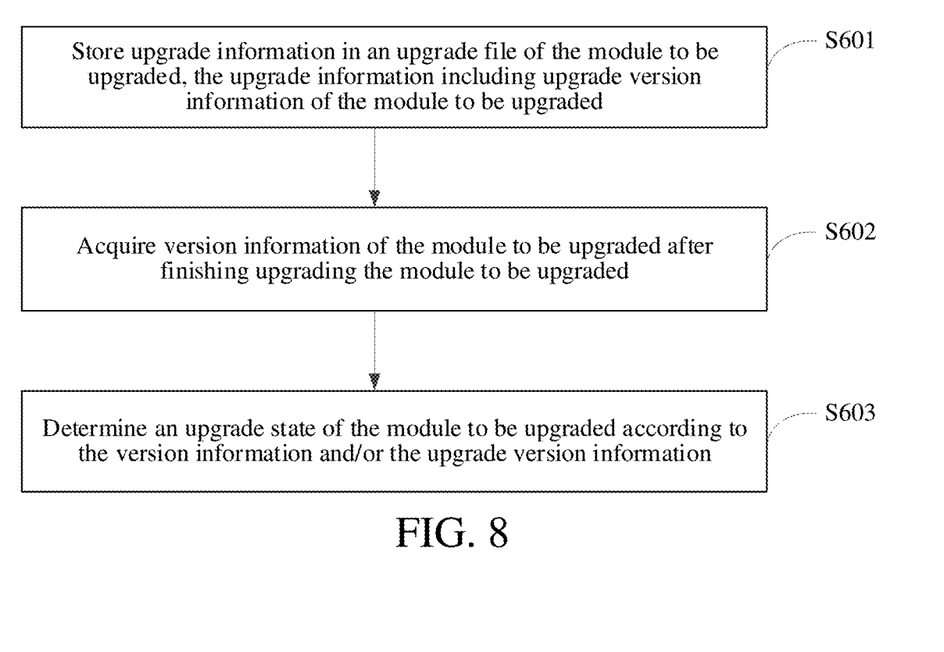
FIG. 8 is a flowchart of a module upgrade method in a UAV system according to Embodiment 6 of the present invention.

FIG. 8 is a flowchart of a module upgrade method in a UAV system according to Embodiment 6 of the present invention. On the basis of the foregoing embodiment, as shown in FIG. 8, the method in this embodiment may include the following steps.

In S601, upgrade information in an upgrade file of the module to be upgraded is stored, the upgrade information including upgrade version information of the module to be upgraded.

Specifically, after the upgrade file of the module to be upgraded is obtained, upgrade information in the upgrade file such as upgrade version information of the upgrade module is stored.

In S602, version information of the module to be upgraded is acquired after finishing upgrading the module to be upgraded.

In S603, an upgrade state of the module to be upgraded is determined according to the version information and/or the upgrade version information.

In this embodiment, after the module to be upgraded is upgraded for multiple times, this embodiment also needs to detect an upgrade state of the module to be upgraded. Specifically, according to the foregoing steps, upgrade version information and current version information of the module to be upgraded are obtained, the upgrade state of the module to be upgraded is determined according to the upgrade version information and/or the version information of the module to be upgraded, and the upgrade state of the module to be upgraded can be accurately determined.

The upgrade state of the module to be upgraded may include: non-upgrade, successful upgrade and unsuccessful upgrade.

In a possible implementation of this embodiment, S503 may include the following steps.

When the version information is not acquired, it is determined that the module to be upgraded is in a non-upgraded state.

When the version information is acquired and the version information is the same as the upgrade version information, it is determined that the module to be upgraded is in a successfully upgraded state.

When the version information is acquired and the version information is different from the upgrade version information, it is determined that the module to be upgraded is in an unsuccessfully upgraded state.

Specifically, the module to be upgraded is booted. If the module to be upgraded is successfully booted, version information of the module to be upgraded is acquired. If the version information of the module to be upgraded is not acquired at this moment, it may be determined that the module to be upgraded is in a non-upgraded state.

If the version information of the module to be upgraded may be obtained, the version information of the module to be upgraded is matched with the upgrade version information of the module to be upgraded. If the version information of the module to be upgraded is the same as the upgrade version information, it is determined that the module to be upgraded is in a successfully upgraded state. If the version information of the module to be upgraded is different from the upgrade version information, it is determined that the module to be upgraded is in an unsuccessfully upgraded state.

Finally, the upgrade state of the module to be upgraded is stored into the storage unit of the module to be upgraded. For example, the upgrade result is stored into a section of Flash of the UAV system. The section of Flash cannot be refreshed.

Alternatively, during the above storage process, an identifier of the module to be upgraded, a version number of the module to be upgraded, and the upgrade state of the module to be upgraded are also stored. For example, an upgrade state identifier is represented by Un, Un=0 represents non-upgrade, Un=1 represents successful upgrade, and Un=2 represents unsuccessful upgrade.

With continued reference to FIG. 3, according to the foregoing method, the upgrade result of each module to be upgraded in the UAV system may be determined as shown in table 3:

TABLE 3

| Camera | Version number | Upgrade state identifier | ... | Flight control module | Version number | Upgrade state identifier | ... |
|---|---|---|---|---|---|---|---|
| n = 0 | V11 | U1 | ... | n = 7 | V17 | U2 | ... |

In this embodiment, through the foregoing method, the upgrade state of the module to be upgraded is detected, and the upgrade detection accuracy is further improved. Meanwhile, the upgrade state of the module to be upgraded is summarized and stored, so that the version information and the upgrade result of the module to be upgraded can be conveniently checked.

According to the module upgrade method in a UAV system, upgrade information in an upgrade file of the module to be upgraded is stored, and when finishing upgrading the module to be upgraded, version information of the module to be upgraded is acquired; and according to the version information and/or the upgrade version information, the upgrade state of the module to be upgraded is determined, and the software upgrade of each module to be upgraded is further accurately checked.

Figure 9:
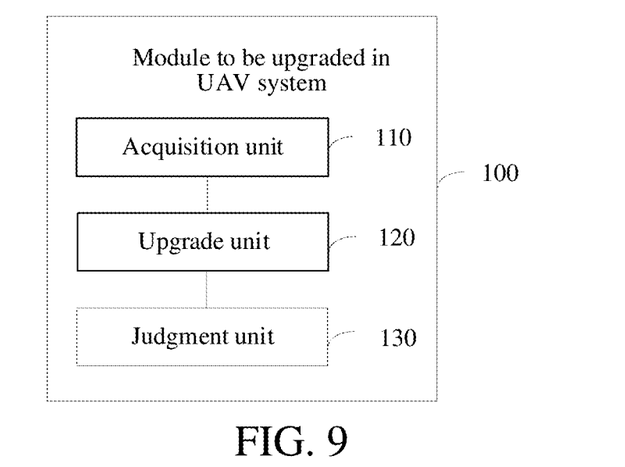
FIG. 9 is a schematic structure diagram of a module to be upgraded in a UAV system according to Embodiment 1 of the present invention.

FIG. 9 is a schematic structure diagram of a module to be upgraded in a UAV system according to Embodiment 1 of the present invention. As shown in FIG. 9, a module to be upgraded 100 in this embodiment may include:

an acquisition unit 110, configured to acquire an upgrade file of the module to be upgraded;

an upgrade unit 120, configured to upgrade the module to be upgraded according to the upgrade file; and a judgment unit 130, configured to judge whether the module to be upgraded is successfully upgraded.

The acquisition unit 110 is further configured to re-acquire an upgrade file of the module to be upgraded when the judgment unit 120 judges that the module to be upgraded is unsuccessfully upgraded.

The upgrade unit 120 is further configured to upgrade the module to be upgraded according to the re-acquired upgrade file until finishing upgrading the module to be upgraded.

The module to be upgraded in this embodiment of the present invention may be configured to execute the technical solution in the foregoing method embodiment. An implementation principle and a technical effect thereof are similar. Details are not described herein again.

In a possible implementation of this embodiment, the judgment unit 130 is specifically configured to judge whether upgrade data in the module to be upgraded is successfully checked, judge whether the module to be upgraded is successfully re-booted if the upgrade data in the module to be upgraded is successfully checked, and determine that the module to be upgraded is successfully upgraded if the module to be upgraded is successfully re-booted.

In another possible implementation of this embodiment, finishing upgrading the module to be upgraded includes:

when an upgrade count of the module to be upgraded is smaller than a first preset threshold, successfully upgrading the module to be upgraded, and finishing upgrading; or, when the upgrade count of the module to be upgraded is greater than or equal to the first preset threshold, finishing upgrading the module to be upgraded.

In another possible implementation of this embodiment, the module to be upgraded is communicatively connected to a previous module through a serial interface. The acquisition unit 110 is specifically configured to acquire an upgrade file of the module to be upgraded, which is sent by the previous module through the serial interface.

In another possible implementation of this embodiment, the upgrade file of the module to be upgraded is sent after the previous module closes a serial communication link with other modules except the module to be upgraded.

In another possible implementation of this embodiment, the acquisition unit 110 is further specifically configured to re-acquire, when an upgrade count of the module to be upgraded is greater than or equal to a second preset threshold, an upgrade file of the module to be upgraded, which is sent after the previous module closes the serial communication link with the other modules, the second preset threshold being smaller than the first preset threshold.

In another possible implementation of this embodiment, the module to be upgraded includes a storage unit. The acquisition unit 110 is specifically configured to acquire an upgrade file of the module to be upgraded, and store the upgrade file into the storage unit of the module to be upgraded.

In another possible implementation of this embodiment, the acquisition unit 110 is further specifically configured to re-acquire an upgrade file of the module to be upgraded from the storage unit.

Figure 10:
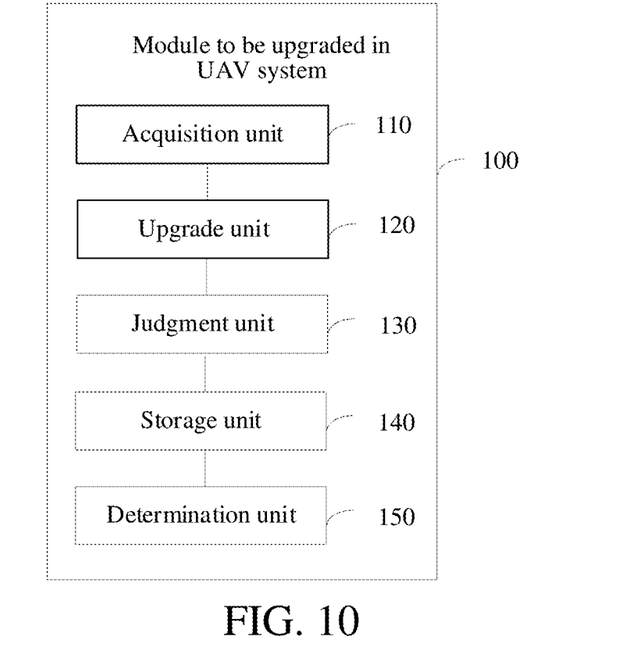
FIG. 10 is a schematic structure diagram of a module to be upgraded in a UAV system according to Embodiment 2 of the present invention.

FIG. 10 is a schematic structure diagram of a module to be upgraded in a UAV system according to Embodiment 2 of the present invention. On the basis of the foregoing embodiment, as shown in FIG. 10, the module to be upgraded 100 in this embodiment may further include:

a storage unit 140, configured to store upgrade information in an upgrade file of the module to be upgraded, the upgrade information including upgrade version information of the module to be upgraded, the acquisition unit 110 being further configured to acquire version information of the module to be upgraded after finishing upgrading the module to be upgraded; and a determination unit 150, configured to determine an upgrade state of the module to be upgraded according to the version information and/or the upgrade version information.

In another possible implementation of this embodiment, the determination unit 150 is specifically configured to: determine, when the version information is not acquired, that the module to be upgraded is in a non-upgraded state; determine, when the version information is acquired and the version information is the same as the upgrade version information, that the module to be upgraded is in a successfully upgraded state; and determine, when the version information is acquired and the version information is different from the upgrade version information, that the module to be upgraded is in an unsuccessfully upgraded state.

The module to be upgraded of the embodiments of the present invention may be used to execute the technical solution of the method embodiment shown above, the implementation principle and the technical effect are similar, and detailed description is omitted.

Figure 11:
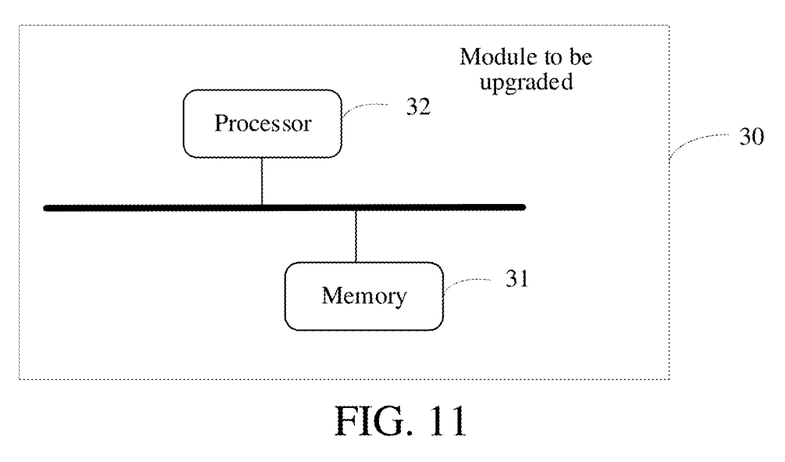
FIG. 11 is schematic structure diagram of a module to be upgraded according to an embodiment of the present invention.

FIG. 11 is schematic structure diagram of a module to be upgraded according to an embodiment of the present invention. As shown in FIG. 11, a module to be upgraded 30 in this embodiment includes:

a memory 31, configured to store a computer program; and a processor 32, configured to execute the computer program to implement the module upgrade method in a UAV system. The implementation principle and the technical effect are similar, and detailed description is omitted.

Here, the memory 10 may be the same as the memory device in the module to be upgraded in the foregoing embodiment, or the memory 10 may be independent of the foregoing storage device, which will not be limited here.

Further, when at least part of the functions of the module upgrade method in a UAV system in the embodiments of the present invention are implemented by software, the embodiments of the present invention also provide a computer storage medium. The computer storage medium is used to store a computer software instruction for upgrading the software. The computer software instruction, when run on a computer, causes the computer to perform various possible module upgrade methods in a UAV system in the foregoing method embodiment. The processes or functions described in accordance with the embodiments of the present invention may be generated, in whole or in part, when the computer-executed instruction is loaded and executed on the computer. The computer instruction may be stored in the computer storage medium or transmitted from one computer storage medium to another computer storage medium. The transmission may be wireless (e.g., cellular communication, infrared, short-range wireless, microwave, etc.) transmission to another website site, computer, server or data center. The computer readable storage medium may be any available medium capable of being accessed by a computer or include one or more data storage devices integrated by an available medium, such as a server and a data center. The usable medium may be a magnetic medium (for example, a floppy disk, a hard disk, or a magnetic tape), an optical medium (for example, a DVD), a semiconductor medium, or the like.

Finally, it is to be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without making the essence of the corresponding technical solutions departing from the scope of the technical solutions of the embodiments of the present invention.

What is claimed is:

1. A module upgrade method in an unmanned aerial vehicle (UAV) system, applied to a module to be upgraded in the UAV system, comprising:

acquiring an upgrade file of the module to be upgraded;

upgrading the module to be upgraded according to the upgrade file;

judging whether the module to be upgraded is successfully upgraded; and if no, reacquiring an upgrade file of the module to be upgraded, and upgrading the module to be upgraded according to the re-acquired upgrade file until finishing upgrading the module to be upgraded;

wherein finishing upgrading the module to be upgraded comprises:

when an upgrade count of the module to be upgraded is smaller than a first preset threshold, successfully upgrading the module to be upgraded, and finishing upgrading; or, when the upgrade count of the module to be upgraded is greater than or equal to the first preset threshold, finishing upgrading the module to be upgraded;

wherein the module to be upgraded is communicatively connected to a previous module through a serial interface, and acquiring an upgrade file of the module to be upgraded comprises:

acquiring an upgrade file of the module to be upgraded, which is sent by the previous module through the serial interface, wherein the module to be upgraded does not comprise a storage unit, and the previous module comprises a storage unit and is directly connected to the module to be upgraded through the serial interface.

2. The method according to claim 1, wherein judging whether the module to be upgraded is successfully upgraded comprises:

judging whether upgrade data in the module to be upgraded is successfully checked;

if yes, judging whether the module to be upgraded is successfully re-booted; and if yes, determining that the module to be upgraded is successfully upgraded.

3. The method according to claim 1, wherein judging whether the module to be upgraded is successfully upgraded comprises:

judging whether the upgraded module to be upgraded is successfully re-booted; and if yes, determining that the upgraded module is successfully upgraded.

4. The method according to claim 1, wherein the upgrade file of the module to be upgraded is sent after the previous module closes a serial communication link with other modules except the module to be upgraded.

5. The method according to claim 4, wherein reacquiring an upgrade file of the module to be upgraded comprises:
when an upgrade count of the module to be upgraded is greater than or equal to a second preset threshold, reacquiring an upgrade file of the module to be upgraded, which is sent after the previous module closes the serial communication link with the other modules, the second preset threshold being smaller than the first preset threshold.

6. The method according to claim 1, wherein the module to be upgraded comprises a storage unit, and acquiring an upgrade file of the module to be upgraded comprises:
acquiring an upgrade file of the module to be upgraded, and storing the upgrade file into the storage unit of the module to be upgraded.

7. The method according to claim 6, wherein reacquiring an upgrade file of the module to be upgraded comprises:
reacquiring an upgrade file of the module to be upgraded from the storage unit.

8. The method according to claim 1, further comprising:
storing upgrade information in an upgrade file of the module to be upgraded, the upgrade information comprising upgrade version information of the module to be upgraded;
acquiring version information of the module to be upgraded after finishing upgrading the module to be upgraded; and
determining an upgrade state of the module to be upgraded according to the version information and/or the upgrade version information.

9. The method according to claim 8, wherein determining an upgrade state of the module to be upgraded according to the version information and/or the upgrade version information comprises:
when the version information is not acquired, determining that the module to be upgraded is in a non-upgraded state;
when the version information is acquired and the version information is the same as the upgrade version information, determining that the module to be upgraded is in a successfully upgraded state; and
when the version information is acquired and the version information is different from the upgrade version information, determining that the module to be upgraded is in an unsuccessfully upgraded state.

10. A module to be upgraded, comprising:
a memory, configured to store a computer program; and
a processor, configured to execute the computer program to implement the module upgrade method in an unmanned aerial vehicle (UAV) system according to claim 1.

11. A non-transitory, computer-readable storage medium having a computer program stored therein which, when executed, implements the module upgrade method in an unmanned aerial vehicle (UAV) system according to claim 1.

* * * * *